(12) United States Patent
Hung et al.

(10) Patent No.: US 9,081,249 B2
(45) Date of Patent: Jul. 14, 2015

(54) ELECTROPHORESIS DISPLAY APPARATUS

(75) Inventors: Ming-Chuan Hung, Hsinchu (TW);
Po-Wen Hsiao, Hsinchu (TW);
Sung-Hui Huang, Hsinchu (TW);
Tsung-Yi Lin, Hsinchu (TW);
Wei-Chun Hsu, Hsinchu (TW)

(73) Assignee: E INK HOLDINGS INC., Hsinchu (TW)

( * ) Notice: Subject to any disclaimer, the term of this patent is extended or adjusted under 35 U.S.C. 154(b) by 132 days.

(21) Appl. No.: 13/480,666

(22) Filed: May 25, 2012

(65) Prior Publication Data

US 2012/0314275 A1    Dec. 13, 2012

(30) Foreign Application Priority Data

Jun. 7, 2011    (TW) .............................. 100119818 A

(51) Int. Cl.
*G02B 26/00* (2006.01)
*G08B 5/36* (2006.01)
(Continued)

(52) U.S. Cl.
CPC ................ *G02F 1/167* (2013.01); *G09F 9/302* (2013.01); *G09F 9/372* (2013.01); *H04M 1/0283* (2013.01); *B29L 2031/7232* (2013.01); *G02F 2001/1676* (2013.01); *G06F 1/1626* (2013.01); *G06F 1/1637* (2013.01); *H04M 1/22* (2013.01)

(58) Field of Classification Search
CPC ... G02F 1/137; G02F 1/167; G02F 1/133305; G02F 2001/1672; G09G 3/334; G09G 2380/04; G09G 2380/06; B41J 3/4076
USPC .................. 345/30, 107, 173–175, 550, 556, 345/901–904, 960; 359/23, 240, 275, 296, 359/891, 290; 257/E21.461, E23.01, 257/E17.111, E31.093; 428/166, 321; 156/146, 268; 340/815.55
See application file for complete search history.

(56) References Cited

U.S. PATENT DOCUMENTS

| 6,118,426 A * | 9/2000 | Albert et al. ................... 345/107 |
| 6,486,861 B1 * | 11/2002 | Preas et al. ...................... 345/87 |

(Continued)

FOREIGN PATENT DOCUMENTS

| CN | 102067028 | 2/2008 |
| CN | 201600852 | 10/2010 |

(Continued)

OTHER PUBLICATIONS

Phillip Torrone, "Esquire E-Ink cover hacking?—take apart photos and more . . . ". Sep. 8, 2008. http://web.archive.org/web/20131126165427/http://makezine.com/2008/09/08/esquire-eink-cover-hackin/.*

(Continued)

*Primary Examiner* — Scott J Sugarman
*Assistant Examiner* — Collin X Beatty
(74) *Attorney, Agent, or Firm* — WPAT, PC; Justin King

(57) ABSTRACT

An electrophoresis display apparatus includes an electronic-ink layer, a passive-matrix substrate, and a conducting layer. The passive-matrix substrate has an electrode surface, and the electrode surface has a plurality of electrodes. The conducting layer has a predetermined shape. The conducting layer is disposed between the electronic-ink layer and the electrode surface of the passive-matrix substrate and is used for transmitting the signals on the electrodes contacting the conducting layer to the electronic-ink layer, so that the electronic-ink layer can display an image with the predetermined shape.

10 Claims, 1 Drawing Sheet

(51) Int. Cl.
  *G02F 1/167* (2006.01)
  *G09F 9/302* (2006.01)
  *H04M 1/02* (2006.01)
  *G09F 9/37* (2006.01)
  *H04M 1/22* (2006.01)
  *G06F 1/16* (2006.01)
  *B29L 31/00* (2006.01)

(56) References Cited

U.S. PATENT DOCUMENTS

| | | | |
|---|---|---|---|
| 6,573,880 B1 * | 6/2003 | Simoni et al. | 345/87 |
| 6,573,962 B1 | 6/2003 | Tateno et al. | |
| 2005/0163940 A1 * | 7/2005 | Liang et al. | 428/1.1 |
| 2007/0159473 A1 * | 7/2007 | Osterberg et al. | 345/204 |
| 2007/0285385 A1 * | 12/2007 | Albert et al. | 345/107 |
| 2008/0048970 A1 * | 2/2008 | Drzaic et al. | 345/107 |
| 2009/0085900 A1 * | 4/2009 | Weiner | 345/205 |
| 2009/0096773 A1 * | 4/2009 | Moriya et al. | 345/205 |
| 2009/0168143 A1 * | 7/2009 | Wen et al. | 359/290 |
| 2009/0295731 A1 * | 12/2009 | Kim et al. | 345/168 |
| 2010/0123666 A1 * | 5/2010 | Wickholm et al. | 345/173 |
| 2011/0063204 A1 * | 3/2011 | Kwak et al. | 345/107 |
| 2011/0097549 A1 * | 4/2011 | Verschueren et al. | 428/166 |
| 2011/0116157 A1 * | 5/2011 | Wei et al. | 359/296 |
| 2011/0141069 A1 * | 6/2011 | Hirakata et al. | 345/204 |
| 2011/0175748 A1 * | 7/2011 | Small et al. | 340/815.55 |

FOREIGN PATENT DOCUMENTS

| | | |
|---|---|---|
| CN | 101128862 | 5/2011 |
| TW | 201022815 A1 | 6/2010 |

OTHER PUBLICATIONS

Torrone, P. "Esquire E Ink Cover Hacking? Take apart photos and more . . . ", http://web.archive.org/web/20131126165427/http://makezine.com/2008/09/08/esquire-eink-cover-hackin/, Sep. 8, 2008.*

Taiwan Patent Office, "Office Action", Nov. 14, 2013.

China Patent Office, "Office Action", Jun. 4, 2014.

* cited by examiner

ELECTROPHORESIS DISPLAY APPARATUS

TECHNICAL FIELD

The disclosure relates to a flat panel display apparatus, and more particularly to an electrophoresis display apparatus.

BACKGROUND

Usually, traditional electronic billboards, smart cards, and electronic identifiers display specific images to convey certain information by using liquid crystal displays (LCDs). However, the smart cards and the electronic identifiers, using the liquid crystal displays, are not only power-hungry but also inflexible, causing various restrictions and inconvenience in use. Furthermore, the traditional electronic billboards, using the liquid crystal displays, are also power-hungry, and the images displayed under sunlight cannot be clearly identified.

SUMMARY

The present invention relates to an electrophoresis display apparatus, which is suitable for electronic billboards, smart cards, electronic identifiers, and other information transmission media that are used for displaying specific images.

The present invention provides an electrophoresis display apparatus including an electronic-ink layer, a passive-matrix substrate, and a conducting layer. The passive-matrix substrate has an electrode surface, and the electrode surface has a plurality of electrodes. The conducting layer has a predetermined shape. The conducting layer is disposed between the electronic-ink layer and the electrode surface of the passive-matrix substrate.

In one embodiment of the present invention, the electrophoresis display apparatus further includes a cover configured for covering a display area of the electronic-ink layer. The cover has at least one of a predetermined pattern and a predetermined word. A part of the cover corresponding to the predetermined shape of the conducting layer displayed on the electronic-ink layer is hollowed.

In one embodiment of the present invention, the electrophoresis display apparatus further includes a cover configured for covering a display area of the electronic-ink layer. The cover has at least one of a predetermined pattern and a predetermined word. A part of the cover corresponding to the predetermined shape of the conducting layer displayed on the electronic-ink layer is transparent.

In one embodiment of the present invention, the electrophoresis display apparatus further includes a cover configured for covering a part of a display area of the electronic-ink layer and showing the predetermined shape of the conducting layer displayed on the electronic-ink layer. The cover has at least one of a predetermined pattern and a predetermined word.

In one embodiment of the present invention, the materials of the conducting layer and the electrodes are the same.

In one embodiment of the present invention, the material of the electrodes includes at least one of Copper, Silver, and Carbon.

In one embodiment of the present invention, the shape of the conducting layer includes at least one of solid form, liquid form, and colloidal form.

In one embodiment of the present invention, the conducting layer is able to be set by way of screen printing, slit coating or manual coating.

In one embodiment of the present invention, the electronic-ink layer is configured to display at least one of a black-and-white image and a color image.

In one embodiment of the present invention, the area of the conducting layer is smaller than that of the electronic-ink layer and that of the passive-matrix substrate.

The embodiment of the present invention uses an electronic-ink layer, a passive-matrix substrate, and a conducting layer to construct an electrophoresis display apparatus. The electrophoresis display apparatus has a predetermined shape, and the conducting layer is disposed between the electronic-ink layer and the electrode surface of the passive-matrix substrate, so as to transmit the signals on the electrodes contacting the conducting layer to the electronic-ink layer. Thus, the electronic-ink layer is able to display an image with the predetermined shape. Since the shape of the conducting layer can be designed as actual needs, the electrophoresis display apparatus of the present invention is suitable for electronic billboards, smart cards, electronic identifiers, and other information transmission media that are used for displaying specific images. Furthermore, since the electrophoresis display apparatus is flexible and saves more power than a liquid crystal display apparatus does, the smart cards and the electronic identifiers using the electrophoresis display apparatus need not frequently change or charge the battery and are not damaged easily. Thus, the electrophoresis display apparatus of the present invention eliminates the traditional restrictions and inconvenience. In addition, since the electrophoresis display apparatus display images by ambient light, the images displayed under sunlight on the electronic billboards which uses the electrophoresis display apparatus can be clearly identified.

Furthermore, since the electronic-ink layer is a film, the manufacturers of the electrophoresis display apparatus can directly send the passive-matrix substrate and the electronic-ink layer to customers. Thus, the said customers can make their own configuration and design on the conducting layer, so as to construct their own unique styles of electrophoresis display apparatus and afford more room for designing.

BRIEF DESCRIPTION OF THE DRAWINGS

The above embodiments of the disclosure will become more readily apparent to those ordinarily skilled in the art after reviewing the following detailed description and accompanying drawings, in which.

DETAILED DESCRIPTION OF PREFERRED EMBODIMENTS

The disclosure will now be described more specifically with reference to the following embodiments. It is to be noted that the following descriptions of preferred embodiments are presented herein for purpose of illustration and description only. It is not intended to be exhaustive or to be limited to the precise form disclosed.

Figure 1:
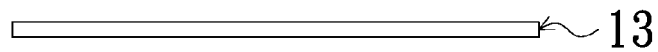
FIG. 1 is a cross-section schematic diagram of an electrophoresis display apparatus according to an embodiment of the present invention.
Figure 1:
Figure 1:
Figure 1:

FIG. 1 is a cross-section schematic diagram of an electrophoresis display apparatus 100 according to an embodiment of the present invention. Referring to FIG. 1, the electrophoresis display apparatus 100 includes an electronic-ink layer 10, a passive-matrix substrate 11, a conducting layer 12, and a cover 13. The passive-matrix substrate 11 has an electrode surface (not labeled), and the electrode surface has a plurality of electrodes 101. The conducting layer 12 has a predetermined shape. The conducting layer 12 is disposed between the electronic-ink layer 10 and the electrode surface of the passive-matrix substrate 11 and is used for transmitting the signals on the electrodes 101 contacting the conducting layer 12 to the electronic-ink layer 10, so that the electronic-ink layer 10 can display an image with the predetermined shape (this will be described later). The cover 13 is used for covering a display area of the electronic-ink layer 10. The cover 13 has at least one of a predetermined pattern and a predetermined word. In addition, the part of the cover 13, which corresponds to the predetermined shape displayed on the electronic-ink layer 10, can be hollowed or transparent.

Figure 2:
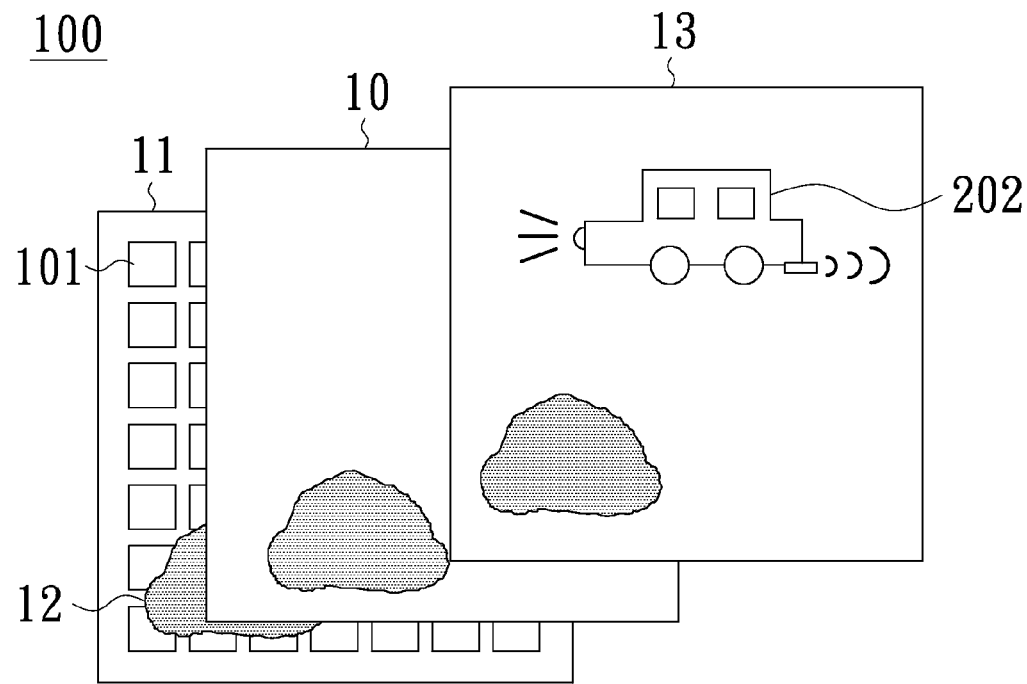
FIG. 2 is a laminated schematic diagram of the electrophoresis display apparatus of FIG. 1 during displaying.

FIG. 2 is a laminated schematic diagram of the electrophoresis display apparatus 100 during displaying. The same labels shown in FIG. 1 and FIG. 2 represent the same objects. Referring to FIG. 2, since the conducting layer 12 has the predetermined shape and can transmit the signals on the electrodes 101 contacting the conducting layer 12 to the electronic-ink layer 10, the electronic-ink layer 10 is able to show an image with the predetermined shape. Furthermore, since the cover 13 has a predetermined pattern 202 and the part of the cover 13 which corresponds to the predetermined shape displayed on the electronic-ink layer 10 can be hollowed or transparent, both of the predetermined pattern 202 and the predetermined shape displayed on the electronic-ink layer 10 can be seen.

Since the shape of the conducting layer 12 and the predetermined pattern and the predetermined word of the cover 13 can be designed as actual needs, the electrophoresis display apparatus 100 is suitable for electronic billboards, smart cards, electronic identifiers, and other information transmission media that are used for displaying specific images.

Certainly, the size of the cover 13 can be changed as actual needs, and the designer can determine whether to use as actual needs. For example, a designer can reduce the size of the cover 13 to cover a part of the display area of the electronic-ink layer 10 and to show the predetermined shape displayed on the electronic-ink layer 10.

Furthermore, the materials of the conducting layer 12 and the electrodes 101 can be the same, and the material of the electrodes 101 can be at least one of Copper, Silver, and Carbon. In Addition, the shape of the conducting layer 12 can be solid form, liquid form, or colloidal form, and the conducting layer 12 can be set by way of screen printing, slit coating, or manual coating. Moreover, although the area of the conducting layer 12 is smaller than that of the electronic-ink layer 10 and that of the passive-matrix substrate 11, it is not used for limiting the present disclosure. In addition, the electronic-ink layer 10 is able to display a black-and-white image or a color image.

As discussed above, the present disclosure uses an electronic-ink layer, a passive-matrix substrate, and a conducting layer to construct an electrophoresis display apparatus. The electrophoresis display apparatus has a predetermined shape, and the conducting layer is disposed between the electronic-ink layer and the electrode surface of the passive-matrix substrate, so as to transmit the signals on the electrodes contacting the conducting layer to the electronic-ink layer. Thus, the electronic-ink layer is able to display an image with the predetermined shape. Since the shape of the conducting layer can be designed as actual needs, the electrophoresis display apparatus of the present invention is suitable for electronic billboards, smart cards, electronic identifiers, and other information transmission media that are used for displaying specific images. Furthermore, since the electrophoresis display apparatus is flexible and has lower power consumption than a liquid crystal display apparatus, the smart cards and the electronic identifiers using the electrophoresis display apparatus need not frequently change or charge the battery and are robust. Thus, the electrophoresis display apparatus of the present invention eliminates the traditional restrictions and inconvenience. In addition, since the electrophoresis display apparatus display images by ambient light, the images displayed under sunlight on the electronic billboards which uses the electrophoresis display apparatus can be clearly identified.

Furthermore, since the electronic-ink layer is a film, the manufacturers of the electrophoresis display apparatus can directly send the passive-matrix substrate and the electronic-ink layer to customers. Thus, the said customers can make their own configuration and design on the conducting layer, so as to construct their own unique styles of electrophoresis display apparatus and afford more room for designing.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electrophoresis display apparatus, comprising:
   an electronic-ink layer;
   a passive-matrix substrate, having an electrode surface, the electrode surface comprising a plurality of electrodes arranged as a square array;
   a conducting layer, having a predetermined shape, the conducting layer being disposed between the electronic-ink layer and the electrode surface of the passive-matrix substrate and configured to transmit a plurality of signals on the electrodes to the electronic-ink layer, so that the electronic-ink layer can display an image having the predetermined shape; and
   a cover, configured for covering a display area of the electronic-ink layer and showing the predetermined shape of the conducting layer displayed on the electronic-ink layer,
   wherein the cover and the electronic-ink layer have the same area size and shape.

2. The electrophoresis display apparatus according to claim 1,
   wherein the cover has at least one of a predetermined pattern and a predetermined word, a part of the cover corresponding to the predetermined shape of the conducting layer displayed on the electronic-ink layer is hollowed.

3. The electrophoresis display apparatus according to claim 1,
   wherein the cover has at least one of a predetermined pattern and a predetermined word, a part of the cover corresponding to the predetermined shape of the conducting layer displayed on the electronic-ink layer is transparent.

4. The electrophoresis display apparatus according to claim 1,
   wherein the cover has at least one of a predetermined pattern and a predetermined word.

5. The electrophoresis display apparatus according to claim 1, wherein the materials of the conducting layer and the electrodes are the same.

6. The electrophoresis display apparatus according to claim 5, wherein the material of the electrodes comprises at least one of Copper, Silver, and Carbon.

7. The electrophoresis display apparatus according to claim 1, wherein the form of the conducting layer comprises at least one of solid form, liquid form, and colloidal form.

8. The electrophoresis display apparatus according to claim 7, wherein the conducting layer is able to be set by way of screen printing, slit coating or manual coating.

9. The electrophoresis display apparatus according to claim 1, wherein the electronic-ink layer is configured to display at least one of a black-and-white image and a color image.

10. The electrophoresis display apparatus according to claim 1, wherein the area of the conducting layer is smaller than that of the electronic-ink layer and that of the passive-matrix substrate.

* * * * *